(12) United States Patent  
Salomonsson et al.

(10) Patent No.: US 12,379,355 B2
(45) Date of Patent: *Aug. 5, 2025

(54) CHROMATOGRAPHY COLUMN AND METHOD OF ASSEMBLING THE SAME

(71) Applicant: Cytiva Sweden AB, Uppsala (SE)

(72) Inventors: Daniel Salomonsson, Uppsala (SE); Mats Lundkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,467

(22) Filed: Jul. 11, 2024

(65) Prior Publication Data

US 2024/0361282 A1    Oct. 31, 2024

Related U.S. Application Data

(63) Continuation of application No. 17/294,710, filed as application No. PCT/EP2019/083735 on Dec. 4, 2019, now Pat. No. 12,066,413.

(30) Foreign Application Priority Data

Dec. 7, 2018 (GB) ..................................... 1819984

(51) Int. Cl.
 *G01N 30/60* (2006.01)
 *B01D 15/20* (2006.01)
 *B01D 15/22* (2006.01)

(52) U.S. Cl.
 CPC ....... *G01N 30/6082* (2013.01); *B01D 15/206* (2013.01); *B01D 15/22* (2013.01)

(58) Field of Classification Search
 None
 See application file for complete search history.

(56) References Cited

U.S. PATENT DOCUMENTS 5,191,801 A       3/1993   Allen
2009/0277254 A1 * 11/2009  Matanin ............. B01J 20/28004
                                                    73/61.53

(Continued)

FOREIGN PATENT DOCUMENTS

EP       0213901 A2    3/1987
EP       2239029 A1    10/2010

(Continued)

OTHER PUBLICATIONS

PCT International Search Report and Written Opinion for PCT/EP2019/083735 mailed Jun. 24, 2020 (15 pages).

(Continued)

*Primary Examiner* — Richard C Gurtowski
(74) *Attorney, Agent, or Firm* — Eversheds-Sutherland (US) LLP

(57) ABSTRACT

Disclosed is a chromatographic separation column assembly (100) comprising a column cylinder (120) having a cylinder wall (126) including an inner wall surface (124) partially defining a column volume (50), and a column component (110/130) insertable into to the cylinder (120), wherein at least an edge region (113/133) of the column component is intended to be in contact or adjacent a part of the inner wall surface (124) in use, the edge region and the contacting or adjacent part of inner wall surface each being formed from a compatible heat fusible material or materials, and wherein at least the cylinder wall in the area of the contacting or adjacent part of the inner wall is formed from a material which allows transmission of the light energy needed to cause said fusing of the adapter plate edge region to the inner wall surface.

15 Claims, 5 Drawing Sheets

(56) References Cited

U.S. PATENT DOCUMENTS

| | | |
|---|---|---|
| 2012/0037555 A1 | 2/2012 | Lundin et al. |
| 2013/0068671 A1 | 3/2013 | Gebauer |
| 2013/0193052 A1 | 8/2013 | Witt et al. |
| 2016/0325204 A1 | 11/2016 | Peyser |

FOREIGN PATENT DOCUMENTS

| | | |
|---|---|---|
| WO | 2012/074452 A1 | 6/2012 |
| WO | 2018/087339 A1 | 5/2018 |

OTHER PUBLICATIONS

Great Britain Search Report for GB Application No. 1819984.4 mailed Jun. 25, 2019 (4 pages).

* cited by examiner

CHROMATOGRAPHY COLUMN AND METHOD OF ASSEMBLING THE SAME

CROSS REFERENCE TO RELATED APPLICATIONS

This application is a continuation of U.S. application Ser. No. 17/294,710, filed May 18, 2021, which claims the priority benefit of PCT/EP2019/083735 filed on Dec. 4, 2019, which claims priority benefit of Great Britain Application No. 1819984.4 filed Dec. 7, 2018, which is incorporated herein by reference in their entireties.

TECHNICAL FIELD

The present invention relates to the construction of, and components for, chromatography columns used for liquid chromatographic separation, and methods of construction of such columns and components.

BACKGROUND

Chromatography column assemblies used for liquid chromatography have the function of separating, the constituents of an analyte mixture in suspension, for example compounds, proteins, or other matter in liquid suspension. Known columns comprise a separation volume to enclose liquids in use. In use the volume typically includes a carrier liquid (often called mobile phase) mixed with a porous separation media (often called stationary phase), such as a resin composed of modified agarose. Substantial separation of constituents in a mixture added to one end of the volume takes place as the analyte mixture flows through the porous media carried by the carrier liquid, to an opposite end of the volume.

Prior to any separation process, the bed has to be prepared starting from a suspension of the separation media that has to been introduced into the column assembly volume. The process of bed formation is called 'packing procedure' and is especially critical for packed beds. A packed bed is typically formed by consolidating a suspension of the media particles. For example, the bed can be compressed using a piston arrangement, known as an adapter plate, such that excess carrier liquid is removed. The goal of this procedure is to provide a bed of ideal homogeneity. Large scale columns are preferably prepared by injecting a slurry of media particles through a central slurry nozzle in the adapter plate. The excess liquid during this procedure is removed at the column outlet, while the particles are retained by means of a filter material, i.e. a so-called 'bed support'. The process is complete once the packed bed has uniformly filled the desired volume in the chromatographic column. The packing process is considered as being successful if the homogeneity and stability of the packed bed allows for a good and robust chromatographic performance quantified in terms of a consistent residence time distribution over the bed, which provides a narrow band of analyte at the column assembly's outlet.

Conventionally, the adapter plate is moveable relative to the column wall in order to adjust the volume and is separable from the column wall for disassembly and cleaning after use. In such an arrangement, mechanical fastening is employed to allow disassembly and cleaning. It is then possible for customers to repack their columns for the next procedure. However, there is an increasing desire for single use columns, which are supplied pre-packed, with a low bio-burden, for example substantially sterile, and ready for use. In that case the packing procedure still needs an adapter plate, but the packing can be done at the supplier's premises, under controlled sterile conditions, and the clean column can be shipped to the customer with a traceable quality certification. The inventors further envisage that as an alternative, the customer may produce their own packed columns for single use, for example where unusual sizes or customized separation media is employed. In any event, it is still necessary to hold the adapter plate in place, for example by means of mechanical fastenings between the column wall and adapter plate, to hold the plate in place after packing, and to resist fluid pressure forces during separation procedures. It may occur to the skilled person to hold the adapter plate in place by means of, say, adhesive, but since the inside wall of the column is often wet, the plate having been pushed down the previously wet inside wall to compress the separation media, then the application of adhesive is considered to be undesirable. Additionally, plastics are more commonly used for single use columns, and finding a suitable non-toxic or low toxicity adhesive for adhering to plastic that does not use strong solvents or otherwise affect the analyte is also problematic. Moreover, any operations inside the column cylinder wall are awkward or impossible especially for small columns, where means for pushing the adapter plate often obstruct access to the inside of the top mouth of the column. Mechanical fixings conventionally comprise tie-bars which hold opposing column assembly end plates in place by tension of the bars. In turn, that tension is reacted by compression in the column cylinder, meaning that the column it has to be made sufficiently strong to withstand not just the working fluid pressure but also the compressive forces exerted by the tie bars, or the like So fixing in place an adapter plate inside a column cylinder wall of a single use column in a low cost and speedy way is a problem.

To avoid distortion of a band of separated analyte mixture constituents, known columns have a uniform cross sectional area so the column cylinder construction usually includes a right circular cylinder having flat ends which incorporate inlets and outlets. The flat ends can be in addition to the adapter plate mentioned above. In that way constituents progress uniformly through the bed from end to end without experiencing any cross-sectional area changes. Even though it would be possible to form the column assembly wholly from metals such as stainless steel, it is preferred to use some metal components at the ends of column assembly, but transparent materials for the column cylinder: glass for small volume separations (<1 litre column volume); or acrylic plastics (Poly methyl methacrylate-PMMA) for medium to large volume separations (>1 litre). Transparent materials are important when manual procedures are undertaken, and afford a visual confirmation of progress, when procedures are automated. The thermoplastic PMMA has excellent mechanical strength and can be made transparent and so PMMA is widely used for column cylinders. A composite plastics column cylinder is described in a co-pending patent application WO2018087399, the disclosure of which is incorporated herein by reference. Thermoplastics construction lends itself well to single use column assemblies, but holding the adapter plate in place once the column is packed, is still a problem, conventionally addressed using mechanical fixings of the type mentioned above, for example as shown in WO2018087399.

SUMMARY OF THE INVENTION

The inventors present herein embodiments which address the problems mentioned above.

According to an aspect of the invention, there is provided a chromatographic separation column assembly comprising a column cylinder having a cylinder wall including an inner wall surface partially defining a column volume, and a column component insertable into to the cylinder, wherein at least an edge region of the column component is intended to be in contact or adjacent a part of the inner wall surface in use, the edge region and the contacting or adjacent part of inner wall surface each being formed from a compatible heat fusible material or materials, and wherein at least the cylinder wall in the area of the contacting or adjacent part of the inner wall is formed from a material which allows transmission of the light energy needed to cause said fusing of the adapter plate edge region to the inner wall surface.

Thereby, if the column component is an adapter plate, or an end plate fitted into the cylinder and formed from a heat fusible material such as plastics, then heat fusing can take place, for example by means of laser welding, when energy from the laser propagates through the column wall into the inner wall surface, whereat the energy can be turned into heat by absorption of the light energy, sufficient to melt the component edge region(s) and the portion of the inner wall surface together. Further fusing of the wall and component at further locations will fix the component and cylinder together securely.

In an embodiment, the column wall is at least at a relevant light transmissive location formed from an amorphous or otherwise generally light transmissive thermoplastic, e.g. semi-amorphous, which allows at least a portion of laser light energy to propagate through the wall for causing said heat fusion.

In an embodiment, the further component is formed, at least at the edge region, from a crystalline, semi crystalline, coloured, filled, or coated thermoplastic, having properties which allow absorption of at least a substantial proportion of any laser light energy transmitted through the wall.

According to yet another aspect of the invention, there is provided a method for fusing a component of a chromatography column assembly inside a chromatography column, the method comprising the steps of:
 a) providing a chromatography column cylinder having a wall including an inner surface, the wall being formed at least partially from thermoplastics material which is at least partially light energy transmissive and heat fusible;
 b) providing a component inside the column having an edge region adapted to be in contact with, or adjacent a part of the inner surface, the edge region at least being formed from heat fusible thermoplastics material compatible with the heat fusible thermoplastic material of the wall;
 c) causing light energy to propagate through the light energy transmissive material of the wall toward the component, the light energy being of sufficient magnitude to heat-fuse the heat fusible material of the component to the heat fusible material of the wall at a melt area where the propagation path of the light meets the edge region;
 d) moving the propagation path relative to the wall and component; and
 e) continuing step c) during said movement resulting from step d), or repeating step c) at further locations of the melt area.

In embodiments, step e) may provide a continuous seam of heat fused materials, or intermittently fused material, analogous to 'stitched' fused regions. Since the component may include a sliding seal, it is then not necessary to provide a continuous fused seam, instead the fused material may only need to fix the component in position without providing a fluid seal. The light energy may be laser light either continuously supplied or supplied as a pulse, for example a repeating pulse. Herein, 'light' means electromagnetic energy at or around the visible light spectrum, including but limited to visible light wavelengths.

The method may be preformed whilst the component is forced to compress chromatography media inside the column's volume and the compressing forces are released once the fusing steps are completed.

The invention extends to apparatus for carrying out the method mentioned above, or a similar method.

More advantages and benefits of the present invention will become readily apparent to the person skilled in the art in view of the detailed description below.

DRAWINGS

The invention will now be described in more detail with reference to the appended drawings, wherein.

DETAILED DESCRIPTION

Figure 1:
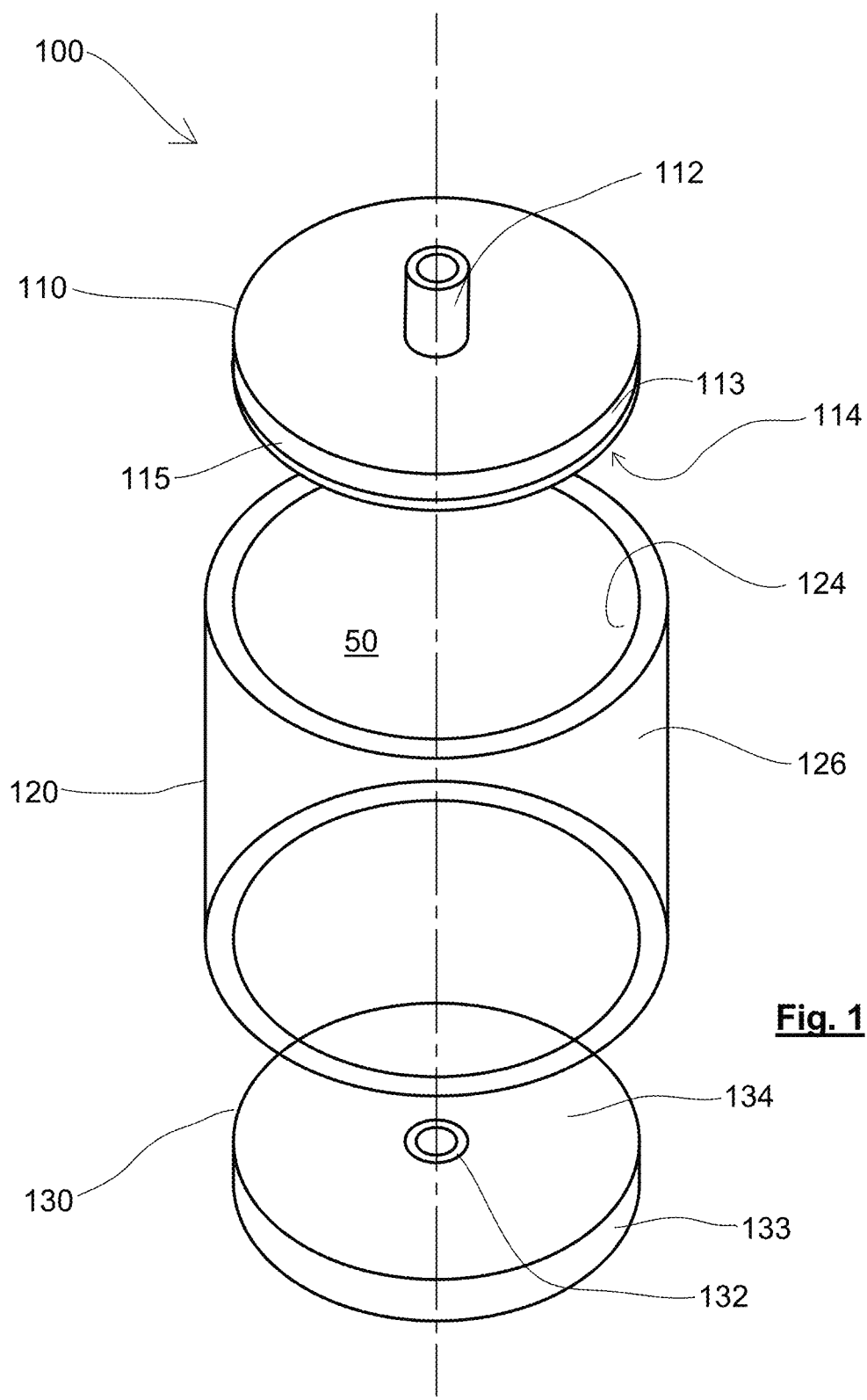
FIG. 1 shows an exploded view of a chromatography column assembly according to the invention.

FIG. 1 shows and exploded view of an unfilled chromatography column 100 assembly, comprising a hollow thermoplastics cylindrical column 120, a thermoplastics base 130, and a thermoplastics adapter plate 110, each being connectable in the manner described below to provide the chromatography column assembly 100.

The assembly includes a top port 112 and a lower port 132, each shown in a simplified form. In practice these ports may contain multiple inlets, outlets and valves for opening and closing flow paths into and out of a chromatography column volume 50 here of about 10-50 litre capacity defined between an inner wall 124 and the inner faces 114 and 134 of the adapter plate 110 and base 130 respectively. A sliding seal 115 is disposed around the adapter plate as described below. The edge regions 113 and 133 of the adapter plate 110 and base 130 respectively are assembled by heat fusing as described below, to the inner surface 124 of the column cylinder wall 126.

Figure 2:
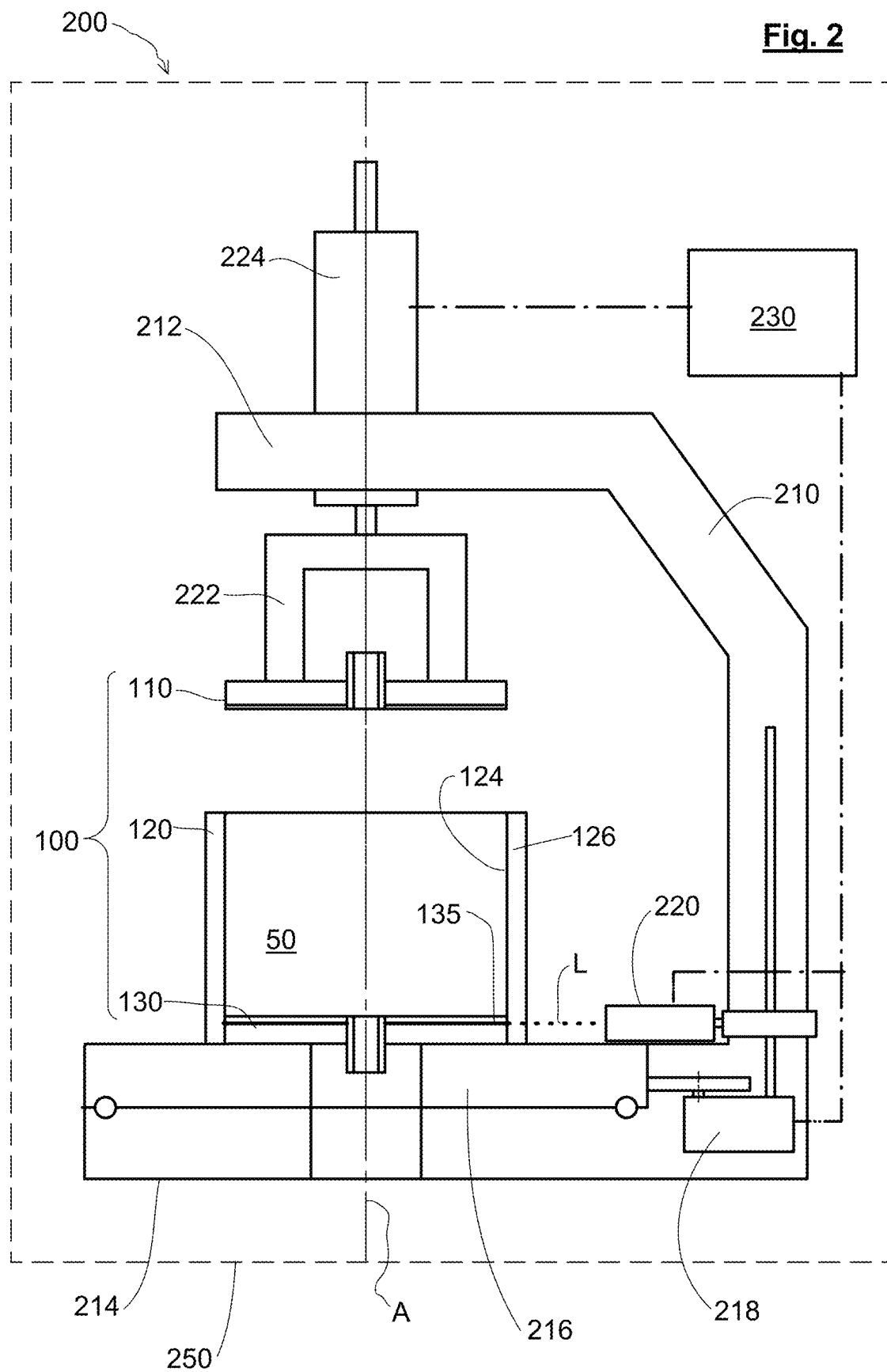
FIGS. 2,3 and 4 show the column assembly of FIG. 1 mounted in assembly apparatus.

FIG. 2 shows the chromatography column 100 partially assembled, in an assembly apparatus 200. The assembly apparatus 200 comprises a support frame 210 which includes overhead support arm 212 and a base 214, which in turn includes a turntable 216, rotatable about a central axis Arts the cylinder 120 and the base 130. On the base 214 are also located a drive means 218 for controllably rotating the turntable 216 and for moving up and down a laser 220 slidably on the frame 210. In FIG. 2 the adapter plate 110 is supported on a yoke 222. The yoke is movable up and down on the axis A by means of an actuator in this case an electrically controlled linear actuator 224. The drive means 218, the actuator, 224 and the laser 220 are collectively controllable by means of a controller 230. In use, in the configuration illustrated, the laser 220 is positioned at a height by the drive means 218 such that its output light L is radially outwardly of the base 130 relative to the axis A. The laser 220 is controlled to produce laser light L which readily propagates through the wall 126 of the column cylinder 120 and is absorbed at the edge region of the base 130 such that the base edge is melted and fuses with the inner surface 124 column 120 in a continuous ring 135 of heat fusion. That heat fusion ring 135 provides a seal between the column 120 and the base 130. That fusing and the column packing steps described below all take place in a sterile environment, such as within a sterile chamber 250.

Figure 3:
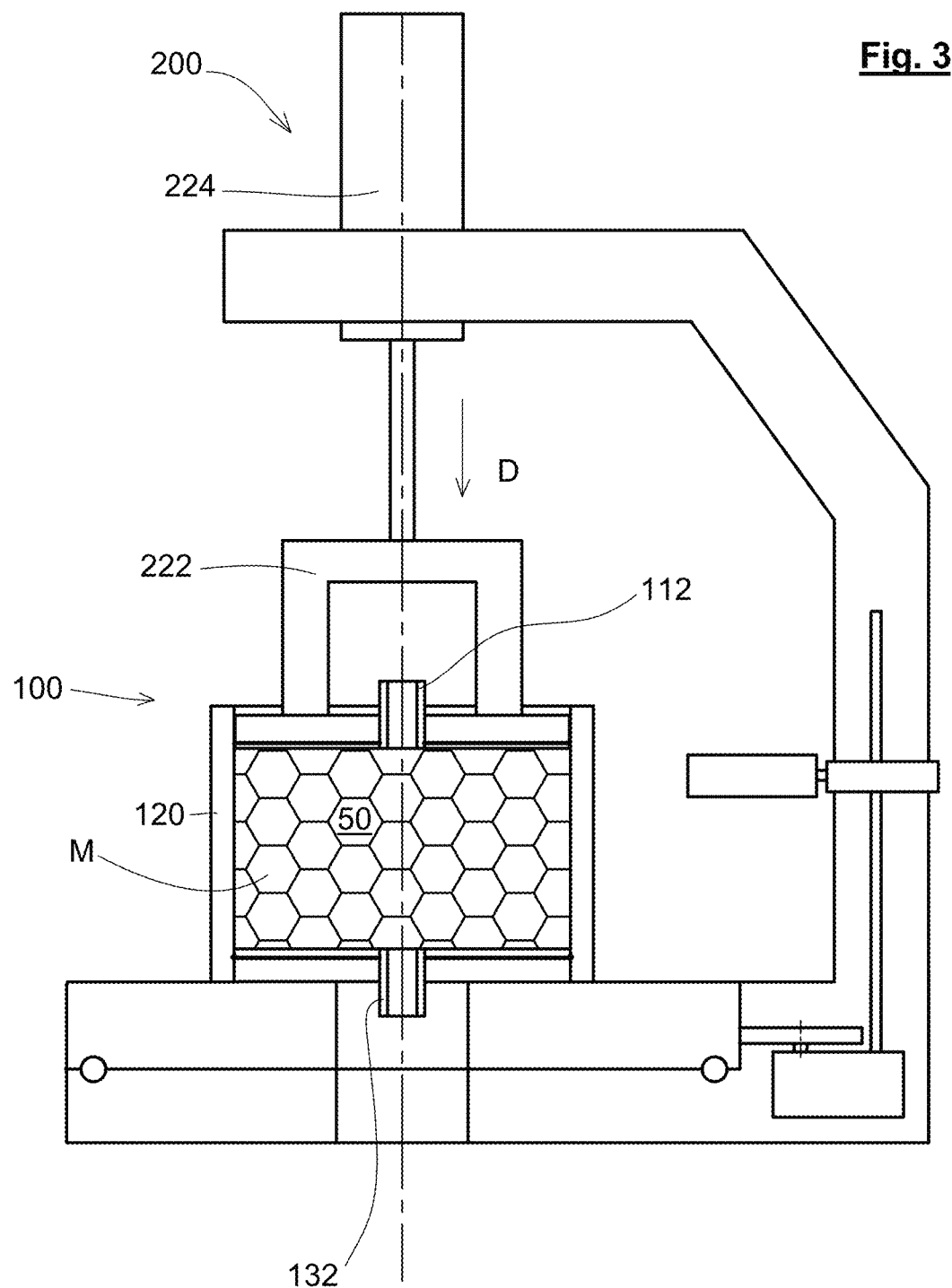

In FIG. 3 the column assembly 100 is shown, and the assembly apparatus 200 is shown, omitting some of its features for better clarity. In this illustration, the yoke 222 has been lowered by the actuator 224 in the direction of arrow D so that the adapter plate 110 is inside the column cylinder 120 and chromatography media M has been introduced into the volume 50 via the upper port 112. When sufficient media M has been introduced, the lower port 132 of the column assembly 100 is closed.

Figure 4:
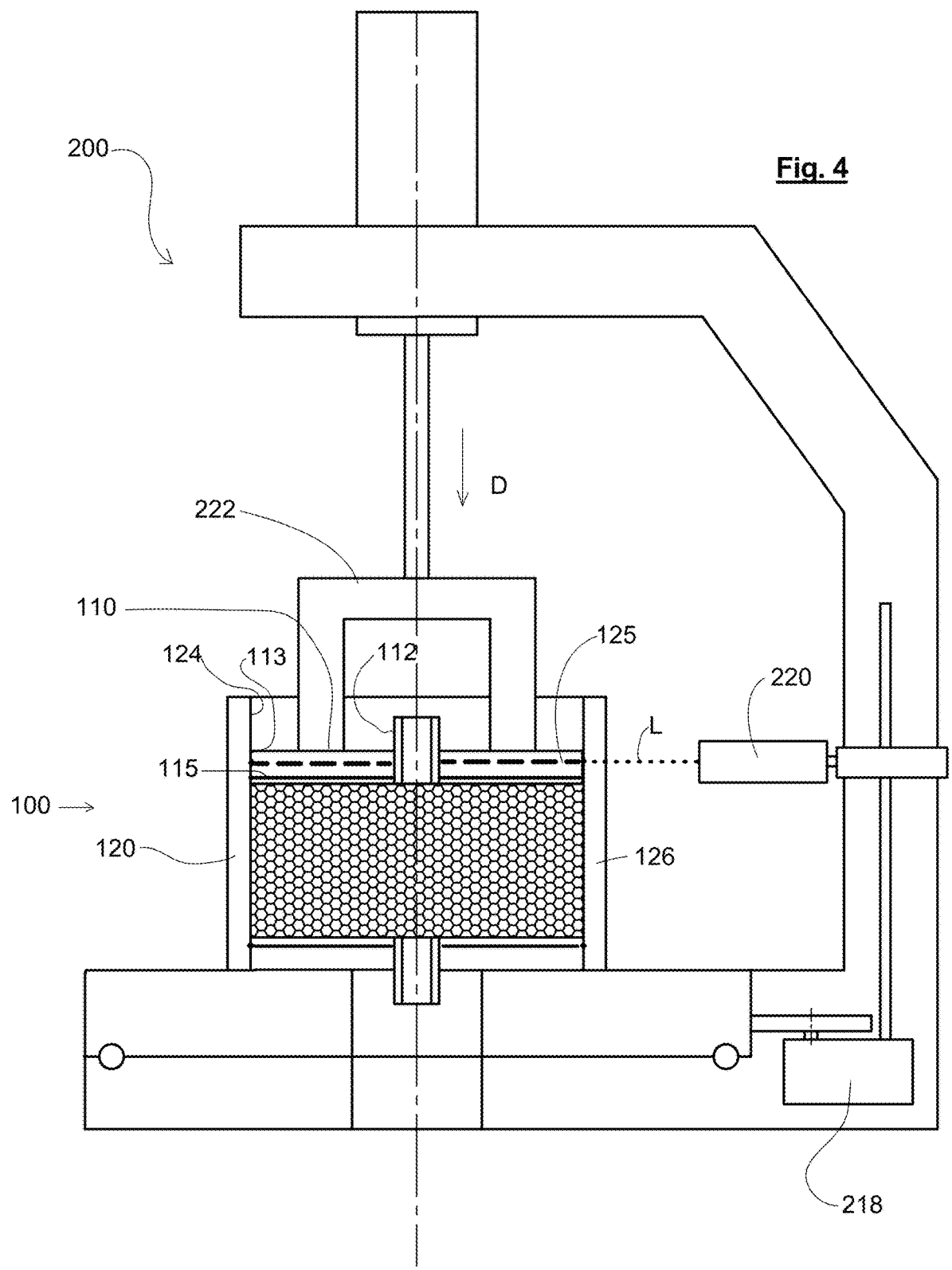

FIG. 4 shows a further view of the column assembly 100 and assembly apparatus. In this view, the yoke 222 lowered further in the direction of arrow D, such that the adapter plate 110 is forced into the volume 50 to provide a compressed bed of media. The adapter plate seal 115 acts to prevent media from escaping between the inner wall surface of the column 120 and the edge 113 of the adapter plate 110. In this position, the laser 220 is raised by the drive 218 such that its output is at the same height as the edge of the adapter plate 110. The laser 220 is controlled to produce laser light L, which again propagates through the column wall 126, to be absorbed by the edge 113 of the adapter plate 110 thereby heat fusing the edge of the adapter plate, above the seal 115, to the inner surface 124 of the column 120, at a region 125. In this case the heat fusion region 125 can be intermittent because the seal 115 provides liquid sealing and the heat fusion region 125 need only provide sufficient a bond of strength to prevent the adapter plate being forced out of the column cylinder by fluid working pressure. Then, closing the upper port 112 provides a completely sealed chromatography column which can be used simply by removing transport seals over the upper and lower ports 112/132, connecting suitable conduits, and opening the ports in a closed system (not shown), with no need to perform column packing operations prior to use of the now prepacked column assembly 100.

Figure 5A:
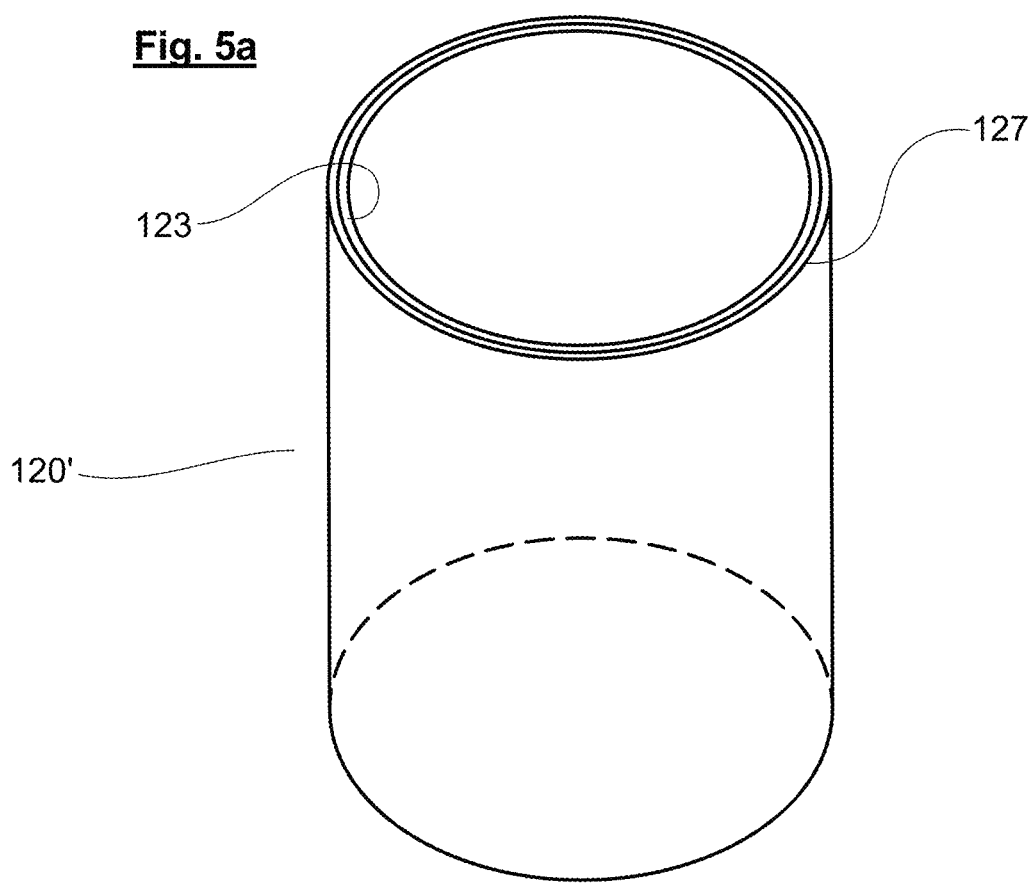
FIGS. 5a and 5b show a column cylinder which is an alternative to the column cylinder shown in FIG. 1.

An alternative column 120' is shown in FIG. 5*a*. The column cylinder 120' includes an inner layer 123 formed from a tube of polypropylene (PP) and an outer layer 127 formed from a PMMA polymer formed directly onto the inner PP tube 123 by means of overlaying the inner tube 123 with a methyl methacrylate liquid resin and polymerizing the same using a catalyst such as an organic peroxide, for example methyl ethyl ketone peroxide (MEKP) dissolved in dimethyl phthalate, cyclohexane peroxide, or diallyl phthalate. Thereby, a single component two-layer construction is formed which has no gaps or voids between the layers. The slight shrinkage of the PMMA when it polymerises adds to the mechanical bond between the inner layer 123 and outer layer 127. This composite construction is then used in a chromatography column assembly, 100 for example as shown in FIG. 1.

Figure 5B:
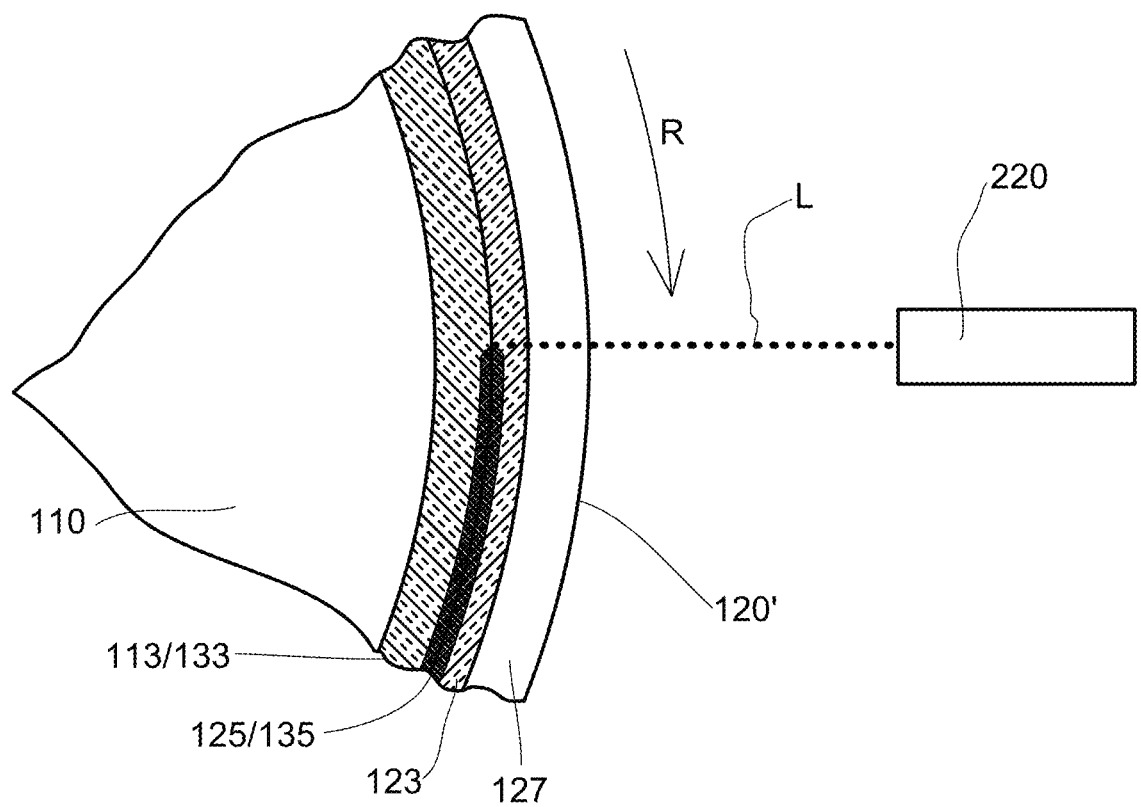

FIG. 5*b* shows an enlarged partial cross-sectional area of a portion of heat fused material 125/135 of the column assembly 100. In this case the adapter plate 110 or the base 130 has been fitted inside the column cylinder wall 126, for example as shown in FIG. 4. The laser light L has propagated through the outer PMMA layer 127 of the column, and, as a result of the partially transmissive properties of the inner PP layer 123 has propagated a few millimetres beyond the outer layer 127 to the edge of the adapter plate 113 or base 133. The laser light L is of sufficient energy to cause localised heating at a region 125/135, which coincides with the boundary between the edge region 113/133 and the inner surface 124. It is possible with this arrangement to melt the inner tube 123 as well as the edge region 113/133. Continuous or intermittent relative rotation R together with control of the laser 2220, can produce the desired heat fusing magnitude, and a continuous (as illustrated) or discontinuous welded seam can be formed.

Thus it can be seen that the above provides an effective mechanical fixing between the base 130, the adapter plate 110, or any other component within column cylinder, and the inner surface of tat cylinder, without the need to have access to the inner volume 50 of the cylinder.

Herein thermoplastic are considered to encompass polymer materials that exhibit plastic properties especially when their temperature is elevated and begin to flow when their temperature is increased further. Thus, it is possible to weld adjacent thermoplastics material together by means of heat fusion. Typically, such heat fusion will take place in a range of about 120-350° C.

Thermoplastics may be further characterized as amorphous (clear/glassy) or semi crystalline (milky appearance). Semi crystalline plastics have small crystallites surrounded by amorphous material. The crystallites diffuse light, resulting in a milky appearance. That property limits the loss free transmission of laser radiation. If increased absorption of laser light is desired, fillers such as carbon black can be added to the plastics. Plastics such as polyethylene (PE); high density polyethylene (HDPE), polypropylene (PP), nylon (PA), polyetheretherketone (PEEK); polyvinylcholide (PVC); polytetrafluoroethylene (PTFE) HDPE; PA; PTFE; PET; PEEK are generally formed as a semi-crystalline plastics, while polymethylmethacrylate (PMMA); polycarbonate (PC), and polystyrene (PS) can be readily formed as amorphous plastics. Such plastics can be used in substitution for the plastics mentioned in the embodiments above.

The laser welding mentioned above relies on the principle that laser light of the correct wavelength can propagate through amorphous plastics with little or no loss, whereas the laser light is rapidly absorbed in semi-crystalline plastics, such that at or close to the semi-crystalline plastics surface, enough laser light energy is absorbed to cause local melting, and a resultant heat fusion of that local plastics. The depth of penetration of the laser light is very much dependent on the laser light wavelength. So, in the embodiments illustrated and described above, it is preferred that the column cylinder 120 is manufactured completely or partially from an amorphous thermoplastic such as the PMMA described above. Alternatively, preferably, the column 120' as mentioned above is formed as a composite of amorphous thermoplastic 127 for strength, and an inner tube 123 of semi-crystalline thermoplastics such as the PP mentioned above, for better chemical resistance. In the present invention the laser welding technique employed is transmission laser welding, where the beam L is delivered through the outer wall 126/127 of the column 120/120' and propagates with little loss in energy to the inner surface 124 where heating and melting takes place. The heating is dictated partially by the laser-absorbing properties of the edge region 113.133 to be welded, and/or by additives and/or coatings at the edge region.

A laser with a wavelength in the 750-1500 nm range provides good results and this may be provided by diode, fibre, and neodymium-doped yttrium aluminium garnet (Nd:YAG) laser. The laser power needed is less then 1000 W, typically about 200 W for reasonably quick welding speeds of several metres per minute. Longer wavelengths provide more energy absorption, until at around 10 µm wavelength most of the energy is absorbed into any plastics including amorphous plastics. Thus a wavelength below 10 µm is required for this process. The degree of energy absorption in this range depends also on the presence of additives in the plastics and whether the plastic is semi-crystalline or amorphous. If no fillers or pigments are present in the thermoplastic, for example the PP liner 123, the laser light at 750-1500 nm wavelength will penetrate a few millimetres into that semi-crystalline plastics and is hardly attenuated at all in amorphous plastics column layer 127. The absorption can be contrived to be maximized at the edge region 111/131 for example by means of additives such as pigments or fillers, especially carbon-black pigment in the edge region 111/131.

The invention is not to be seen as limited by the embodiments described above, but can be varied within the scope of the appended claims as would be readily apparent to a person skilled in the art. For instance, the thermoplastic materials described could be changed whilst maintaining utility. It will be evident that the thermoplastics material need only be used at relevant areas and different materials, for example metals, fibre filed plastics, thermosetting plastic etc. could be used where heat fusing is not required. The separate base plate 130 could be omitted in which case a cup-shaped column cylinder 120 could be used, and the step of welding the base to the column cylinder could be omitted. As mentioned above any column assembly component could be transmission welded in the manner described above, and such components would include but is not limited to: end plates; internal or external webs or buttresses attached to the end plates; fluid distribution plates; media retaining frits or porous layers; side or end ports formed directly in the column cylinder material; and/or mechanical supports attached to the column cylinder or end plates. Whilst circular column cylinders and illustrated and preferred, other shapes could be used to good effect, such as triangular, square or hexagonal sections. Adjustment of the position of the laser 220 could be made to accommodate non-round cylinders. The embodiments show the laser 220 stationary and the column assembly 100 being rotatable, however other arrangements are possible, for example the laser could orbit the stationary or rotatable column assembly. Alternatively, optics could be employed so that both the laser and the column are stationary, but the optics cause the laser beam L to propagate in a movable beam directed radially inwardly relative to the axis A.

Other additions, omissions, or variants will be apparent to the skilled addressee. Where appended dependent claims are drafted to encompass multiple features in a single claim for legal conciseness and it is envisaged such features could be combined with other claims, removed or added to, without generalisation.

The invention claimed is:

1. A chromatographic separation column assembly comprising:
    a column cylinder having a cylinder wall including an inner wall surface partially defining a column volume, and
    a first column component comprising an adapter plate having a sliding seal disposed therearound and a second column component comprising a base, wherein at least the first column component is insertable into to the column cylinder,
    wherein at least an adapter plate edge region of the first column component is intended to be in contact or adjacent a part of the inner wall surface in use, the adapter plate edge region being formed from a compatible heat fusible material or materials, and
    wherein at least the cylinder wall in the area of the contacting or adjacent part of the inner wall surface is formed from a material which allows transmission of light energy needed to cause said fusing of the adapter plate edge region or the adapter plate edge region and the base edge region to the inner wall surface.

2. The column assembly as claimed in claim 1, wherein light energy is supplied by a laser, of sufficient power to cause said heat fusion.

3. The column assembly as claimed in claim 1, wherein the column cylinder wall is, at least at the area of the contacting or adjacent part of the inner wall surface, formed from an amorphous or otherwise generally light transmissive thermoplastic material which allows at least a portion of light energy to propagate through the column cylinder wall for causing said heat fusion.

4. The column assembly as claimed in claim 1, wherein a further component is formed, at least at an edge region, from a crystalline, semi crystalline, colored, filled, or coated thermoplastic, having properties which allow absorption of at least a substantial proportion of any light energy transmitted through the column cylinder wall.

5. The column assembly as claimed in claim 3, wherein the amorphous or otherwise generally light transmissive thermoplastic material of the column cylinder is a PMMA.

6. The column assembly as claimed in claim 1, wherein the column cylinder further includes an inner cylinder liner.

7. A method for fusing a component of a chromatography column assembly inside a chromatography column, the method comprising the steps of:
    a) providing a chromatography column cylinder having a wall including an inner surface, the wall being formed at least partially from thermoplastics material which is at least partially light energy transmissive and heat fusible, and partially defines a column volume;
    b) providing a first column component comprising an adapter plate having a sliding seal disposed therearound and a second column component providing a base inside the column cylinder;
    c) causing light energy to propagate through the light energy transmissive material of the wall toward the first column component, or the first column component and the second column component, the light energy being of sufficient magnitude to heat-fuse the heat fusible material of the first column component or the first column component and the second column component to the heat fusible material of the wall at a melt area where the propagation path of the light meets respective edge regions of the first column component or the first column component and the second column component;
    d) moving the propagation path relative to the wall and the first column component or the first column component and the second column component; and
    e) continuing step c) during said movement resulting from step d), or repeating step
    c) at further locations of the melt area.

8. The method as claimed in claim 7, wherein step e) is continued to provide a continuous seam of heat fused materials around the column cylinder, or is repeated to provide intermittently fused material.

9. The method as claimed in claim 7, wherein the light energy is laser light energy which is supplied either continuously, as a pulse, or a repeating pulse.

10. The method as claimed in claim 7, further including the step of at least partially filling the column volume with chromatography media, compressing the media with the first column component and preforming steps c), d) and e) whilst said the compressing is at least partially maintained.

11. The method as claimed in claim 10, wherein the compressing is released once the fusing steps are completed.

12. The chromatography column assembly according to claim 1, wherein the chromatography column assembly is pre-packed and disposable.

13. A chromatography column component fusing apparatus for manufacturing a chromatographic separation column assembly according to claim 1, the fusing apparatus comprising a frame including a chromatography column cylinder support table, and a support for the first column component of the chromatography column insertable within the column cylinder, the apparatus further including a laser light generator for providing light energy directable to propagate through a wall of the column cylinder toward a first column component edge region, or a first column component edge region and a second column component edge region, and of sufficient magnitude to cause heat fusing of the edge with an area of the inner wall surface of the column cylinder which is contacting or is adjacent to said edge region.

14. The assembly as claimed in claim 13, wherein the apparatus further including an actuator for manipulating said adapter plate into the column cylinder, and for compressing chromatography media disposed within the volume of the column cylinder.

15. The apparatus as claimed in claim 13, wherein said support includes a turntable, and wherein the turntable, the actuator and laser light source are controlled by a controller to provide continuous or intermittent fusing of the adapter plate to the inner surface of the column cylinder around an axis of rotation of the turntable.

* * * * *